United States Patent Office 3,296,340
Patented Jan. 3, 1967

3,296,340
SELF-EXTINGUISHING ALKENYL AROMATIC
RESINS CONTAINING SULFENAMIDES
Jacob Eichhorn, Midland, Mich., assignor to The Dow
Chemical Company, Midland, Mich., a corporation of
Delaware
No Drawing. Filed Apr. 1, 1963, Ser. No. 269,736
6 Claims. (Cl. 260—892)

This invention relates to self-extinguishing resins and methods for their preparation. More particularly the invention concerns the enhancement of the flameproofing properties of an alkenyl aromatic polymer containing a halide by the admixture therewith of a sulfenamide.

Halides are sometimes added to alkenyl aromatic resins such as polystyrene to make them self-extinguishing, i.e., incapable of sustaining a flame for more than a few seconds when the flame used to ignite the resin is removed. The halides most often used for thus purpose are chlorinated and brominated organic compounds although inorganic compounds such as ammonium bromide are sometimes used. Although the desired flameproofing characteristics may be obtained with these agents, it is necessary in some instances to use substantial quantities of the halide to obtain the desired self-extinguishing properties. These high concentrations of halide may introduce any of several undesirable properties in the resin. For example, the halide often dilutes or plasticizes the resin thereby reducing physical properties such as tensile strength and heat distortion temperature. Another property commonly affected is the color of the resin, particularly after exposure to elevated temperature or actinic light owing to the poor thermal and photochemical stability of the halides. Also, severe corrosion of molding equipment is frequently experienced with resins containing halides having poor thermal stability. Some halides impart a musty odor to the resin when used at high concentrations. To avoid these undesirable effects of the halide the quantity used is often that which provides the minimum required flameproofing properties.

I have found that the self-extinguishing properties of the halide can be enhanced substantially by the use of a sulfenamide in combination with the halide whereby a lesser amount of the flameproofing agent may be employed without sacrificing self-extinguishing properties. The sulfenamides are thiazole derivatives which are used as delayed action accelerators for rubber vulcanization. They have the property of remaining stable at temperatures used in compounding and working rubber prior to vulcanization without initiating the vulcanization until the higher curing temperature is reached. It is possible that a similar reaction mechanism is involved in the flameproofing of resins by halides, i.e., the rate of decomposition of the halide at temperatures up to the ignition temperature of the resin is not adequate to extinguish the flame unless the concentration of the halide in the resin is above a specific minimum. If, however, the resin also contains an agent having the unique ability to accelerate the rate of halide decomposition at elevated temperatures while retarding it at lower temperatures, the resin will be self-extinguishing even though the halide concentration is below that normally considered to be necessary. Thus, the accelerator or adjuvant should have a delayed action as in the case of the sulfenamide rubber accelerator in the sense that the halide decomposition is retarded at normal processing temperatures and is accelerated at or slightly below the ignition temperature.

Rubber cure accelerators are sometimes rated on the basis of the time-viscosity relationship of a gum rubber stock at a particular temperature. A sample of the unvulcanized stock, when run in a Mooney viscosimeter at the specified temperature, first exhibits a decrease in the viscosity then an increase as vulcanization or cure occurs. The length of time required for the viscosity to increase above the minimum an arbitrary number of units on the Mooney viscosity scale is taken as a measure of the delay in activity of the accelerator. For example, the time required for an increase of five units is designated as the "scorch" time whereas that for 30 units is the "cure" time. An article describing this method for evaluating various sulfenamides as vulcanization accelerators was published by Creed et al., in Industrial and Engineering Chemistry, 46, 808 et seq. (1954).

I have found that sulfenamides which are delayed action vulcanization accelerators as characterized by the plot of Mooney viscosity against time are also delayed action adjuvants for self-extinguishing polymers containing halides as flameproofing agents. Thus, N-cyclohexyl-2-benzothiazole sulfenamide, commonly known as "Santocure" in the rubber compounding industry, as well as other sulfenamides having a cure time of about 50 percent or more of that of "Santocure" when present in the same concentration in a similar unvulcanized rubber formulation have been found to be effective adjuvants for self-extinguishing resins.

The sulfenamides which I have found to be effective in flameproofing alkenyl aromatic resins have the general formula:

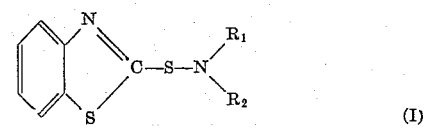

where $R_1$ is hydrogen, an alkyl, cycloalkyl or a phenyl group; $R_2$ is an alkyl, cycloalkyl, phenyl, or the mercaptobenzothiazole group, or where $R_1$ and $R_2$ collectively are

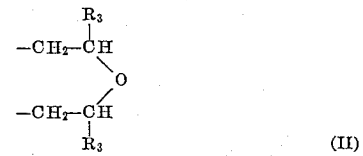

where $R_3$ is hydrogen or an alkyl group; as well as the corresponding sulfenamides represented by the general formula:

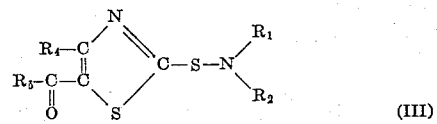

where $R_4$ is an alkyl group and $R_5$ is an alkyl or alkoxy group.

Formula I includes compounds such as N-tert. butyl-2-benzothiazole sulfenamide; N-cyclohexyl-2-benzothiazole sulfenamide; N,N-diethyl-2-benzothiazole sulfenamides represented by Formula II are: N-oxydiethylene-N,N-dicyclohexyl-2-benzothiazole sulfenamide; and N-phenyl-2-benzothiazole sulfenamide. Examples of sulfenamides represented by Formula II are: N-oxydiethylene-benzothiazole-2-sulfenamide and 2,4 - dimethyl-3-oxapentamethylene - benzothiazole-2-sulfenamide. Formula III includes sulfenamides such as 5 carbomethoxy-4-methyl-2-thiazole N-isopropyl sulfenamide and 5-acetyl-4-methyl-2-thiazole N-tert. butyl sulfenamide.

The utility of these compounds in enhancing the self-extinguishing properties of resins was demonstrated in a series of tests. The resin used in these tests was polystyrene. The flameproofing agents were intimately mixed with the resin by dissolving the materials in methyl chloride then rapidly evaporating the solvent thereby producing a foamed structure. Test bars approximately ¼ inch thick by ½ inch wide and 3–5 inches long were cut from the foamed polymer for the burning tests. The self-extinguishing properties were determined by holding one end of the bar in the flame of a micro-burner for four seconds then withdrawing it from the flame and noting the length of time required for the flame to extinguish. The results of these tests are listed in Table I. The self-extinguishing times (S.E.) reported are the averages of several observed values where multiple tests were made. The halide used in preparing these samples was acetylene tetrabromide (ATB). The concentrations of both the sulfenamide and the ATB are expressed as parts per 100 parts of resin (phr.).

TABLE I.—EFFECT OF VARIOUS SULFENAMIDES ON SELF-EXTINGUISHING TIME OF POLYSTYRENE CONTAINING ACETYLENE TETRABROMIDE

| Sulfenamide | Phr. | ATB, phr. | S.E. time, seconds |
|---|---|---|---|
| None | | 2.5 | Burns |
| None | | 3.0 | 8 |
| N-tert.-butyl-2-benzothiazole sulfenamide | 1 | 2 | 1.4 |
| N-cyclohexyl-2-benzothiazole sulfenamide | 1 | 2 | 1.6 |
| N-isopropyl bis(2-benzothiazole sulfen)amide | 1 | 2 | 2.8 |
| N-tert.-butyl bis(2-benzothiazole sulfen)amide | 1 | 2 | 1.0 |
| N-oxydiethylene-benzothiazole-2-sulfenamide | 1 | 2 | 2.4 |
| Diisopropyl benzothiazole sulfenamide | 2 | 2 | 8.4 |
| 2,4-dimethyl-3-oxapentamethylene benzothiazole-2-sulfenamide | 1 | 2 | 2.3 |

From these data it can be seen that polystyrene containing 2.5 parts ATB without a sulfenamide accelerator is not self-extinguishing whereas polymer containing only 2 percent ATB in the presence of 1 percent sulfenamide has a low S.E. time.

These adjuvants are also effective in molded solid resins. Test bars were made by grinding the foamed resin then compression molding the powder at 140–148° C. for 1.5 minutes. Bars prepared in this manner which contained 2 phr. ATB and no adjuvant were not self-extinguishing whereas bars containing only 1 phr. ATB in combination with 1 phr. of N-tert. butyl-2-benzothiazole sulfenamide extinguished in 14 seconds.

The flameproofing properties of halides other than ATB in combination with the sulfenamides were investigated using foamed polystyrene test bars prepared in the same manner as described above. The results of these further tests are listed in Table II. As in Table I, the concentrations of the flameproofing agents are listed in phr. and the self-extinguishing times are the averages of several tests. These data illustrate the ability of the sulfenamides to enhance the self-extinguishing properties of various halides commonly used to prepare flameproof resins.

TABLE II.—SELF-EXTINGUISHING PROPERTIES OF POLYSTYRENE CONTAINING A SULFENAMIDE AND VARIOUS HALIDES

| Halide | Phr. | Sulfenamide | Phr. | S.E. time, seconds |
|---|---|---|---|---|
| Acetylene tetrabromide | 2.5 | None | | Burns |
| Do | 1.5 | (A) | 1 | 7.8 |
| Do | 1.5 | (B) | 1 | 4 |
| Dibromotetrachloroethane | 2.0 | None | | 8 |
| Do | 1.5 | (A) | 0.5 | 3.6 |
| Pentabromomonochlorocyclohexane | 2.0 | None | | Burns |
| Do | 1.5 | (A) | 0.5 | 3 |
| Do | 1.5 | (B) | 0.5 | 3.2 |
| Tris(2,3-dibromopropyl)phosphate | 4 | None | | Burns |
| Do | 3 | (A) | 1 | 3.6 |
| Tetrachloroethane | 12 | None | | Burns |
| Do | 10 | (B) | 2 | 8 |
| Hexachloroethane | 12 | None | | Burns |
| Do | 10 | (B) | 2 | 3.2 |
| Hexachlorobenzene | 12 | None | | Burns |
| Do | 10 | (B) | 2 | 5 |
| Tris(dichloropropyl)phosphate | 15 | None | | Burns |
| Do | 13 | (A) | 2 | 4.8 |
| Do | 13 | (B) | 2 | 5.8 |

(A) N-tert.-butyl-2-benzothiazole sulfenamide.
(B) N-tert.-butyl bis(2-benzothiazole sulfen)amide.

In addition to the halides listed in the above table, these adjuvants may be used to enhance the flameproofing properties of other halides such as ammonium bromide, 2,2-bis[3,5-dibromo - 4 - (2,3,3 - tribromoalloxy)phenyl] propane, bis(2,3,3-tribromoallyl)maleate, and 2,3,3-tribromoallyl 2,4,6-tribromophenyl ether.

These unique combinations of flameproofing agents may be used with homopolymers and copolymers of alkenyl aromatic monomers such as styrene, α-methyl styrene, ethyl styrene, isopropyl styrene, tert. butyl styrene, vinyl toluene, vinyl xylene, and chlorostyrene. This invention may also be used to advantage (1) with copolymers containing principally styrene with minor amounts of other monomers as well as (2) with the high impact type styrene polymers containing about 2–20 weight percent of a rubbery polymer such as polybutadiene, polyisoprene, or a butadiene-styrene elastomer such as GR-S. Table III presents data on the flameproofing properties of a number of these resins containing acetylene tetrabromide in combination with a sulfenamide. The combination of these agents are expressed in the same units as in Tables I and II.

TABLE III.—SELF-EXTINGUISHING PROPERTIES OF ALKENYL AROMATIC RESINS CONTAINING ACETYLENE TETRABROMIDE AND A SULFENAMIDE

| Resin | ATB, phr. | Sulfenamide | Phr. | S.E. time, seconds |
|---|---|---|---|---|
| Polystyrene: 79% styrene, 21% α-methyl styrene | 8 | None | | 15 |
| Do | 6 | (A) | 2 | 8 |
| Do | 6 | (B) | 2 | 5.6 |
| Polystyrene: 93% styrene, 7% acrylonitrile | 4 | None | | 13.6 |
| Do | 3 | (A) | 1 | 1.8 |
| Polystyrene: 95% styrene, 5% GR-S | 4 | None | | 19 |
| Do | 3 | (A) | 1 | 7 |
| Do | 3 | (B) | 1 | 12 |
| Polyvinyltoluene | 8 | None | | Burns |
| Do | 6 | (B) | 2 | 15 |

(A) N-tert.-butyl bis(2-benzothiazole sulfen)amide.
(B) N-isopropyl bis(2-benzothiazole sulfen)amide.

Another technique which may be used to obtain an intimate mixture of the resin and flameproofing agents is that of pressurization. This method of mixing is described in my Patent U.S. 3,058,926. According to this method, about 100 parts by weight of polymer granules are placed in about 150 parts by weight of an aqueous solution which may contain a suspending agent, e.g., one weight percent methyl cellulose. The self-extinguishing agents and about 2–10 weight percent of a blowing agent such as normal pentane, if a foamable resin is desired, are also added to the slurry which is then placed in a pressure vessel where it is agitated and heated to a temperature of 95–130° C. over a period of 15–45 minutes. The slurry temperature is held at that level for a period up to four hours then gradually lowered to the initial starting temperature so that granules will not foam when the reactor is opened. The polymer is separated from the slurry and washed to remove suspending agent and other materials coating the granules. This method has been found to be effective in impregnating the granules with from 70 to 95 or greater percent of the self-extinguishing agents which are added to the slurry.

Table IV lists self-extinguishing times for polystyrene which was flameproofed in this manner. The halide used in these samples was acetylene tetrabromide (ATB). The pressurization time does not include the warm-up and cooling times.

TABLE IV.—POLYSTYRENE FLAMEPROOFED BY PRESSURIZATION

| Sulfenamide | Phr. | ATB, phr. | Pressurization | | S.E. time, seconds |
| --- | --- | --- | --- | --- | --- |
| | | | Temp., °C | Time, hr. | |
| None | | | 3 | 95 | 3 | Burns |
| Do | | | 4 | 95 | 3 | 10 |
| N-tert.-butyl-2-benzothiazole sulfenamide | 2 | 2 | 95 | 1 | 2.6 |
| Do | 2 | 2 | 95 | 4 | 4.2 |
| Do | 2 | 2 | 105 | 3 | 4.8 |
| Do | 2 | 2 | 130 | 0 | 3.6 |
| N-isopropyl bis(2-benzothiazole sulfen)amide | 2 | 2 | 95 | 4 | 3.5 |
| N-tert.-butyl bis(2-benzothiazole sulfen)amide | 2 | 2 | 95 | 4 | 3.8 |

The concentration of halide necessary to obtain the desired flameproofing properties depends to a great extent on the particular halide used as illustrated in Table II. Additionally, some resins require a higher concentration of flameproofing agents than others as shown in Table III. The sulfenamide does not appear to produce a significant effect at concentrations lower than about 0.5 part per 100 parts resin and the maximum or optimum affect appears to be at a concentration of about two parts per 100 parts of resin, although greater concentrations can be used but to considerably lesser advantage. Accordingly, the preferred range of concentration of the sulfenamides as an adjuvant for most halides is from about 0.5 to about 2.0 parts per 100 parts of resin.

From the foregoing, it can be seen that the sulfenamides which are known to be vulcanization accelerators have the further ability to enhance the flameproofing properties of halides in alkenyl aromatic polymers.

I claim:

1. A self-extinguishing alkenyl aromatic resin comprising a polymer of a monomer selected from the group consisting of styrene, α-methyl styrene, ethyl styrene, isopropyl styrene, tert. butyl styrene, vinyl toluene, vinyl xylene and chlorostyrene, the polymer being: (a) a homopolymer of one of the monomers; (b) a copolymer of at least two of the monomers; (c) a copolymer of one of the monomers and acrylonitrile; or (d) a copolymer of one of the monomers and an elastomer selected from the group consisting of polybutadiene, polyisoprene, and butadiene-styrene copolymers, said resin containing as flameproofing agents a halide selected from the group consisting of ammonium bromide, organic chlorides, and organic bromides in combination with about 0.5 to 2 parts per hundred parts resin of a sulfenamide having the general formula:

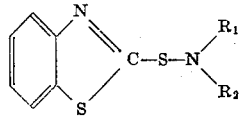

where $R_1$ is hydrogen, an alkyl, cycloalkyl or phenyl group; $R_2$ is an alkyl, cycloalkyl, phenyl or the mercaptobenzothiazole group, or where $R_1$ and $R_2$ collectively are

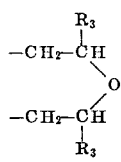

where $R_3$ is hydrogen or an alkyl group, and the general formula:

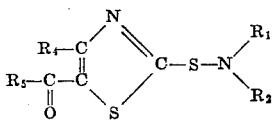

where $R_4$ is an alkyl group and $R_5$ is an alkyl or an alkoxy group.

2. A self-extinguishing resin according to claim 1 wherein said sulfenamide is N-tert.-butyl-2-benzothiazole sulfenamide.

3. A self-extinguishing resin according to claim 1 wherein said sulfenamide is N-isopropyl bis(2-benzothiazole sulfen)amide.

4. A self-extinguishing resin according to claim 1 wherein said sulfenamide is N-tert. butyl bis (2-benzothiazole sulfen)amide.

5. A method of treating an alkenyl aromatic resin comprising a polymer of a monomer selected from the group consisting of styrene, α-methyl styrene, ethyl styrene, isopropyl styrene, tert. butyl styrene, vinyl toluene, vinyl xylene and chlorostyrene, the polymer being: (a) a homopolymer of one of the monomers; (b) a copolymer of at least two of the monomers; (c) a copolymer of one of the monomers and acrylonitrile; or (d) a copolymer of one of the monomers and an elastomer selected from the group consisting of polybutadiene, polyisoprene, and butadiene-styrene copolymers, to produce a self-extinguishing resin comprising:

preparing an aqueous dispersion of resin granules together with flameproofing agents consisting of a self-extinguishing quantity of a halide selected from the group consisting of ammonium bromide organic chlorides, and organic bromides and about 0.5 to 2 parts per hundred parts resin of a sulfenamide having the general formula:

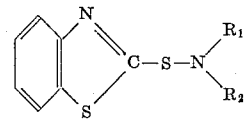

where $R_1$ is hydrogen, an alkyl, cycloalkyl or phenyl group; $R_2$ is an alkyl, cycloalkyl, phenyl or the mercaptobenzothiazole group, or where $R_1$ and $R_2$ collectively are

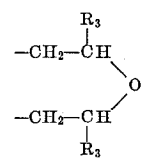

where $R_3$ is hydrogen or an alkyl group, and the general formula:

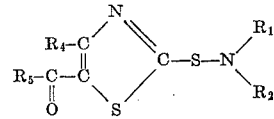

where $R_4$ is an alkyl group and $R_5$ is an alkyl or an alkoxy group, said quantity of halide being less than that required to render said resin self-extinguishing in the absence of said sulfenamide, agitating said dispersion while gradually increasing the temperature thereof to a level in the range 95 to 130° C., maintaining said temperature level for a period up to 4 hours, thereafter gradually decreasing the temperature of said dispersion to approximately room temperature, then recovering said self-extinguishing resin granules therefrom.

6. A method of treating polystyrene to produce a self-extinguishing resin comprising:

dispersing granules of said polystyrene in an aqueous liquid together with a self-extinguishing quantity of a halide selected from the group consisting of ammonium bromide, organic chlorides, and organic bromides and about 0.5 to 2 parts per hundred parts resin of N-tert. butyl-2-benzothiazole sulfenamide, agitating said dispersion while raising the temperature thereof to about 95° C. over a period of about 20 minutes, maintaining the temperature of said slurry at about 95° C. for about 1 to 3 hours, then decreasing the temperature of said dispersion to about room temperature over a period of about 80 minutes, thereafter recovering said self-extinguishing resin from said slurry.

References Cited by the Examiner
UNITED STATES PATENTS

| | | | |
|---|---|---|---|
| 3,001,954 | 9/1961 | Buchholz et al. | 260—2.5 |
| 3,111,502 | 11/1963 | Coran | 260—45.8 |

LEON J. BERCOVITZ, *Primary Examiner.*

M. J. WELSH, *Assistant Examiner.*